United States Patent
He

(10) Patent No.: US 10,094,682 B2
(45) Date of Patent: Oct. 9, 2018

(54) COCKPIT DISPLAY SYSTEMS AND METHODS FOR PERFORMING GLIDE SLOPE VALIDATION PROCESSES DURING INSTRUMENT LANDING SYSTEM APPROACHES

(71) Applicant: HONEYWELL INTERNATIONAL INC., Morris Plains, NJ (US)

(72) Inventor: Gang He, Morristown, NJ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 25 days.

(21) Appl. No.: 15/439,469

(22) Filed: Feb. 22, 2017

(65) Prior Publication Data
US 2018/0238708 A1    Aug. 23, 2018

(51) Int. Cl.
| | |
|---|---|
| *G01C 23/00* | (2006.01) |
| *B64D 43/00* | (2006.01) |
| *B64D 45/08* | (2006.01) |
| *G09G 5/36* | (2006.01) |

(52) U.S. Cl.
CPC .......... *G01C 23/005* (2013.01); *B64D 43/00* (2013.01); *B64D 45/08* (2013.01); *G09G 5/363* (2013.01); *G09G 2380/12* (2013.01)

(58) Field of Classification Search
CPC ...... G01C 23/005; B64D 43/00; B64D 45/08; G09G 5/363; G09G 2380/12
See application file for complete search history.

(56) References Cited

U.S. PATENT DOCUMENTS

| | | | | |
|---|---|---|---|---|
| 6,985,091 B2* | 1/2006 | Price | ................ | G01C 23/005 |
| | | | | 340/966 |
| 7,268,702 B2* | 9/2007 | Chamas | ............ | G01C 23/005 |
| | | | | 340/973 |
| 8,589,071 B2 | 11/2013 | Feyereisen et al. | | |

(Continued)

FOREIGN PATENT DOCUMENTS

| | | |
|---|---|---|
| EP | 2149783 A1 | 2/2010 |
| EP | 3073225 A1 | 9/2016 |

OTHER PUBLICATIONS

Extended EP Search Report for Application No. 18157474.0-1003 dated Jul. 25, 2018.

*Primary Examiner* — Russell Warren Frejd
(74) *Attorney, Agent, or Firm* — Lorenz & Kopf, LLP

(57) ABSTRACT

Cockpit display systems and methods are provided for performing Glide Slope (G/S) validation processes during Instrument Landing System (ILS) approaches. In one embodiment, the cockpit display system utilizes validated G/S signals to selectively correct the viewpoint of a Synthetic Vision System (SVS) scene generated on a Synthetic Vision Primary Flight Display (SV-FPD). In such an embodiment, the cockpit display system may include an ILS receiver, a cockpit display device on which the SV-PFD is generated, and a controller operably coupled to the cockpit display device and to the ILS receiver. During an ILS approach, the controller selectively performs a G/S validation algorithm to determine the validity of the G/S signals received during the ILS approach. If determining that the G/S signals are valid, the controller then repeatedly updates the SVS viewpoint during the ILS approach based, at least in part, on the validated G/S signals.

20 Claims, 4 Drawing Sheets

(56) References Cited

U.S. PATENT DOCUMENTS

| | | | |
|---|---|---|---|
| 8,711,220 B2 * | 4/2014 | Tiana | .................. H04N 7/18 |
| | | | 348/144 |
| 8,928,527 B2 | 1/2015 | He et al. | |
| 9,024,805 B1 | 5/2015 | Jinkins et al. | |
| 9,098,999 B2 | 8/2015 | Snow et al. | |
| 9,257,050 B2 | 2/2016 | Fleiger-Holmes et al. | |
| 9,470,528 B1 | 10/2016 | Wang et al. | |
| 9,489,575 B1 | 11/2016 | Whalen et al. | |
| 9,511,880 B2 * | 12/2016 | He | .................. B64D 45/08 |
| 9,573,698 B1 * | 2/2017 | He | .................. B64D 43/00 |
| 2017/0036776 A1 * | 2/2017 | He | .................. B64D 43/00 |
| 2017/0083206 A1 * | 3/2017 | He | .................. G06F 3/04817 |

* cited by examiner

COCKPIT DISPLAY SYSTEMS AND METHODS FOR PERFORMING GLIDE SLOPE VALIDATION PROCESSES DURING INSTRUMENT LANDING SYSTEM APPROACHES

TECHNICAL FIELD

The following disclosure relates generally to cockpit display systems and, more particularly, to cockpit display systems and methods for performing processes involving glide slope validation during instrument landing system approaches.

BACKGROUND

An Instrumental Landing System (ILS) approach is a type of precision approach useful in guiding an aircraft to a runway under Instrumental Metrological Conditions (IMC). During an ILS approach, a properly-equipped aircraft utilizes an ILS receiver to receive modulated Glide Slope (G/S) signals defining a G/S beam, which has a fixed orientation relative to the runway surface. After an aircraft intercepts the G/S beam, a pilot controls the aircraft to closely follow the beam, to the extent possible, until touchdown with the runway. To assist in this effort, a pilot may be presented with a cockpit display including G/S guidance symbology visually indicating vertical deviations of the aircraft from the G/S beam during the ILS approach. Additional symbology may also be generated on the cockpit display, such as symbology indicating the lateral deviation of the aircraft from a localizer beam. Such G/S guidance symbology has recently been integrated into Synthetic Vision Primary Flight Displays (SV-PFDs), which feature Synthetic Vision System (SVS) scenes. Generally, the SVS scene of a SV-PFD simulates a glass cockpit view (that is, an unobstructed view from the aircraft cockpit under ideal visibility conditions) and is presented from a particular viewpoint (the SVS viewpoint), which corresponds to the current aircraft position and thus varies in conjunction with movement of the aircraft relative to a fixed frame of reference (the earth).

ILS approaches may be assigned to one of three categorizations: Category (CAT) I, II, and III, with CAT III further subcategorized into CAT III(A), III(B), and III(C) approaches. Of the three primary ILS categorizations, CAT I approaches require the greatest visibility requirements and decision height. Newly-published rules (AC20-SVG/S) issued by the Federal Aviation Administration (FAA) now permit the usage of SV-PFDs during ILS CAT I operations to lower than standard (e.g., 200 feet) approach minimums at properly equipped airfields. Thus, in the case of an SV-PFD including G/S guidance symbology, it becomes highly desirable to minimize or eliminate any mismatch between the SVS viewpoint and the G/S guidance symbology. Conventional cockpit display systems, however, may permit such a mismatch to develop between the SVS viewpoint and the G/S guidance symbology, particularly the vertical G/S deviation symbology. Such mismatches may develop due to vertical errors in the altitude data, which typically dictates the vertical component of the SVS viewpoint. The altitude data may be based upon barometric altimeter readings, Global Positioning System (GPS) altitude data, or a combination thereof.

As noted above, the altitude data utilized to determine the vertical SVS viewpoint can be based upon barometric altimeter readings and/or GPS altitude data. However, both of these altitude data sources can be subject to non-trivial inaccuracies in at least some instances. Inaccuracies in barometric altimeter readings can arise from temperature variations, delayed barosetting reports, pilot set errors, and other factors. Relative to barometric altimeter readings, GPS altitude data tends to be more accurate. However, the altitude data provided by a GPS receiver is also subject to inaccuracies, particularly when the aircraft carrying the GPS receiver operates in non-Space-Based Augmentation System (non-SBAS) environments. Regardless of whether they arise from inaccuracies in barometric altimeter readings or inaccuracies in GPS altitude data, such errors in altitude data can thus result in noticeable mismatches between the SVS vertical viewpoint of an SV-PFD and any G/S guidance symbology further produced on SV-PFD. This can be concerning to a pilot when carrying-out an ILS approach, such as a CAT I ILS approach under zero visibility conditions, while relying upon the G/S vertical deviation symbology for authoritative guidance.

BRIEF SUMMARY

Cockpit display systems are provided for performing Glide Slope (G/S) validation processes during Instrument Landing System (ILS) approaches. In one embodiment, the cockpit display system utilizes validated G/S signals to selectively correct the viewpoint of a Synthetic Vision System (SVS) scene generated on a Synthetic Vision Primary Flight Display (SV-FPD). In such an embodiment, the cockpit display system may include an ILS receiver (e.g., a navigation radio), a cockpit display device on which the SV-PFD is generated, and a controller operably coupled to the cockpit display device and to the ILS receiver. The controller selectively performs a G/S validation algorithm to determine the validity or evaluate the trustworthiness of the G/S signals received during the ILS approach. If determining that the G/S signals are valid, the controller repeatedly updates the SVS viewpoint as the aircraft continues to perform the ILS approach based, at least in part, on the validated G/S signals. In implementations wherein G/S vertical deviation symbology is further generated on the SV-PFD, this may help reduce disparities between the SVS viewpoint and the G/S vertical deviation symbology.

In another embodiment, the cockpit display system includes an ILS receiver, such as a navigation radio, configured to receive G/S signals as the aircraft files an ILS approach terminating at a destination runway. The cockpit display system further includes a cockpit display device on which an SV-PFD is generated, as well as a controller operably coupled to the cockpit display device and to the ILS receiver. During operation of the cockpit display system, the controller: (i) selectively performs a G/S validation algorithm to determine or test the validity of the G/S signals received during the ILS approach, and (ii) generates a visual alert on the SV-PFD if determining that the G/S signals are invalid. In certain implementations in which the cockpit display system further includes an Inertial Reference System (IRS) coupled to the controller, the controller may further establish a representative Flight Path Angle (FPA) value as a function of FPA measurements provided by the IRS during the ILS approach. The controller may then determine the validity of the G/S signals based upon any mismatch or disparity between the representative FPA value and an expected G/S beam angle, such as a published G/S beam angle, corresponding to the destination runway.

Embodiments of cockpit display methods involving G/S validation during ILS approaches are further disclosed. The cockpit display method may be carried-out by a cockpit display system including a cockpit display device, an ILS receiver, and a controller operably coupled to the cockpit display device and to the ILS receiver. In one implementation, the cockpit display method includes the step or process of generating an SV-PFD on the cockpit display device including an SVS scene presented from an SVS viewpoint. A G/S validation algorithm is selectively performance by the controller and utilized to determine whether G/S signals detected by the ILS receiver during an ILS approach are valid or trustworthy. If the G/S signals are determined to be valid, the controller then repeatedly refreshes or updates the SV-PFD during the ILS approach to visually adjust a vertical component of the SVS viewpoint in accordance with the validated G/S signals.

BRIEF DESCRIPTION OF THE DRAWING/S

At least one example of the present disclosure will hereinafter be described in conjunction with the following figures, wherein like numerals denote like elements, and:

Figure 1:
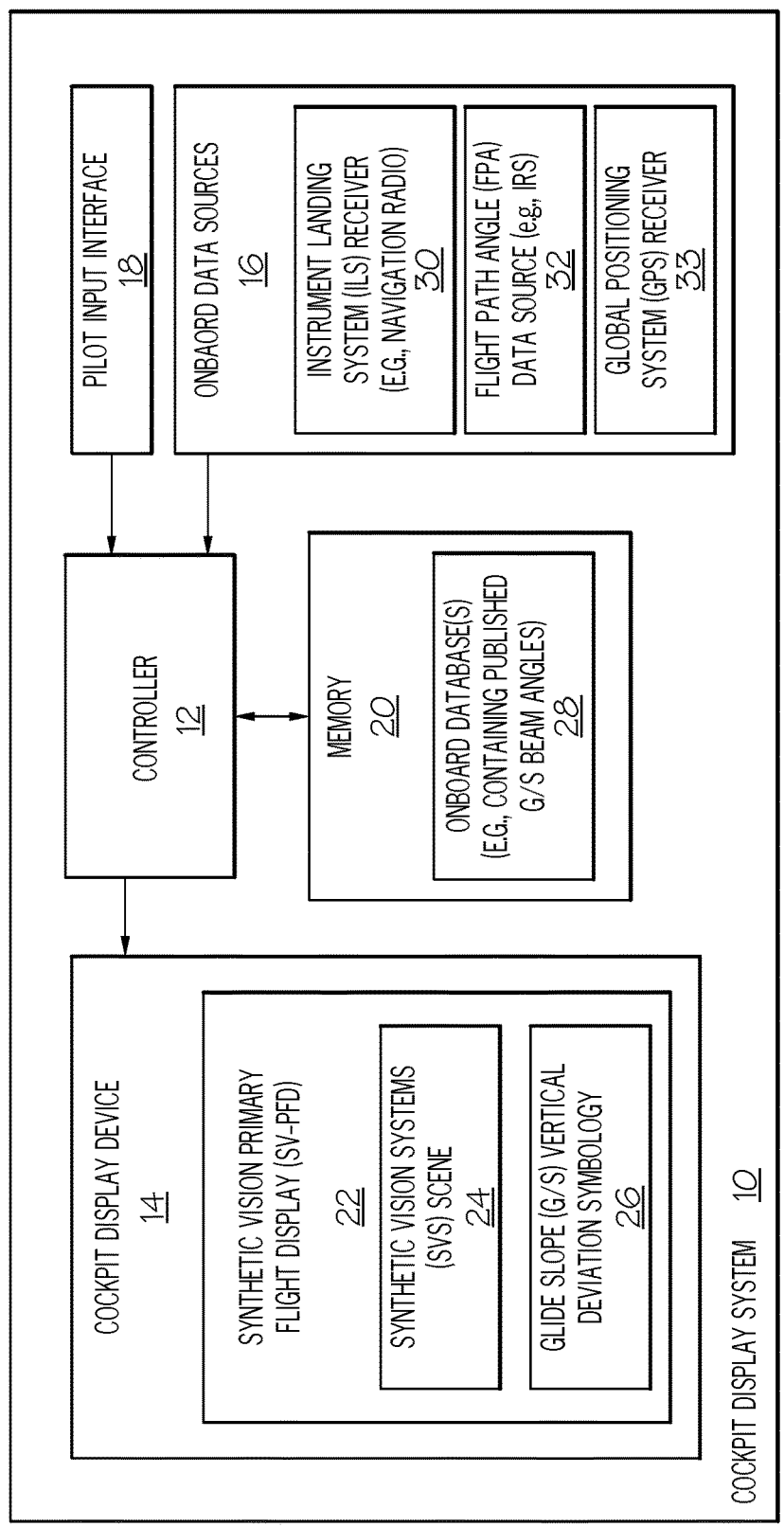
FIG. 1 is a block diagram of a cockpit display system deployed onboard an aircraft and suitable for generating a Synthetic Vision Primary Flight Display (SV-PFD), which is illustrated in accordance with an exemplary and non-limiting embodiment of the present disclosure.
Figure 2:
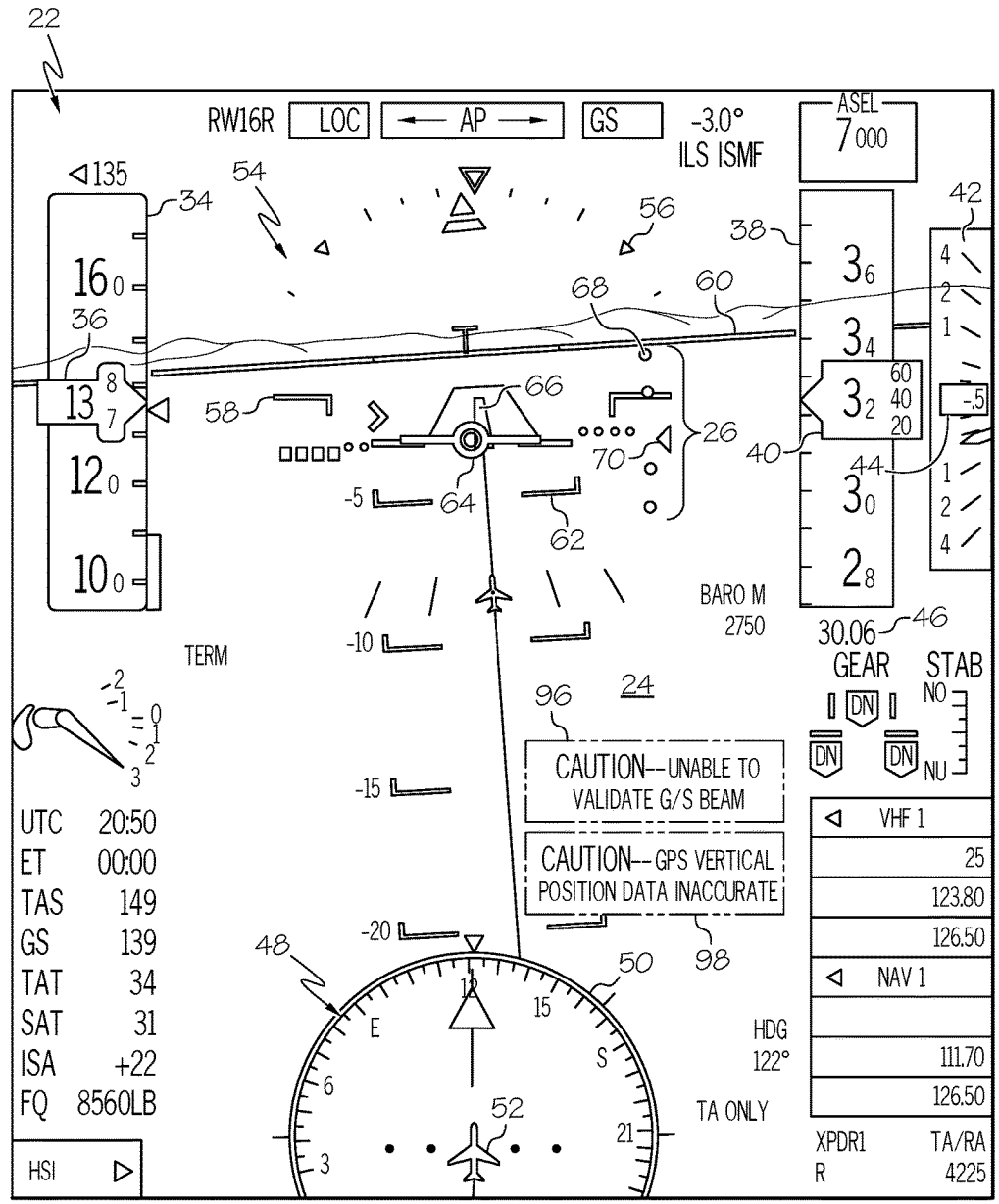
FIG. 2 is a screenshot of an exemplary SV-PFD, which may be generated by the cockpit display system of FIG. 1 to include a Synthetic Vision System (SVS) scene and Glide Slope (G/S) vertical deviation symbology.
Figure 3:
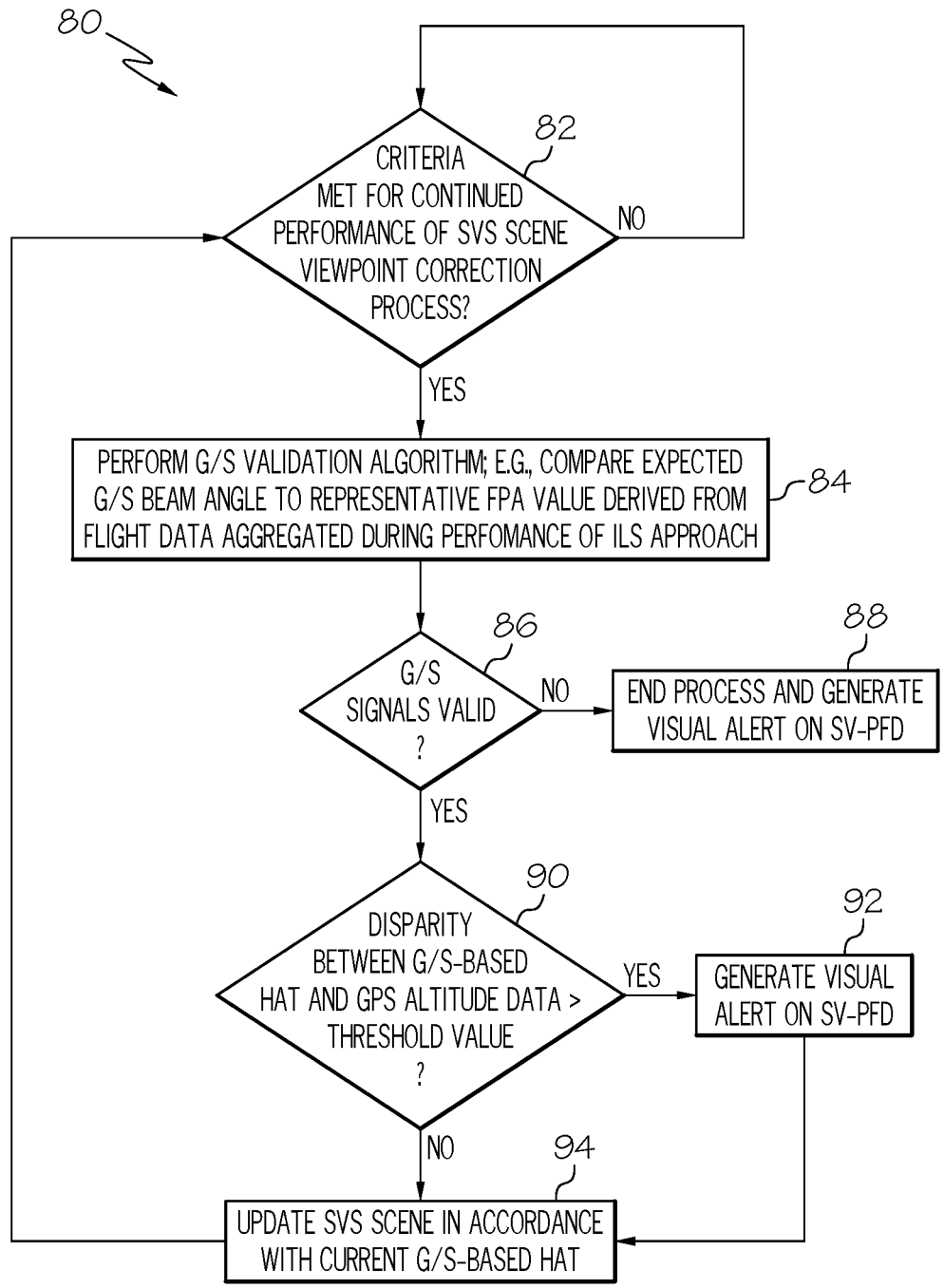
Figure 4:
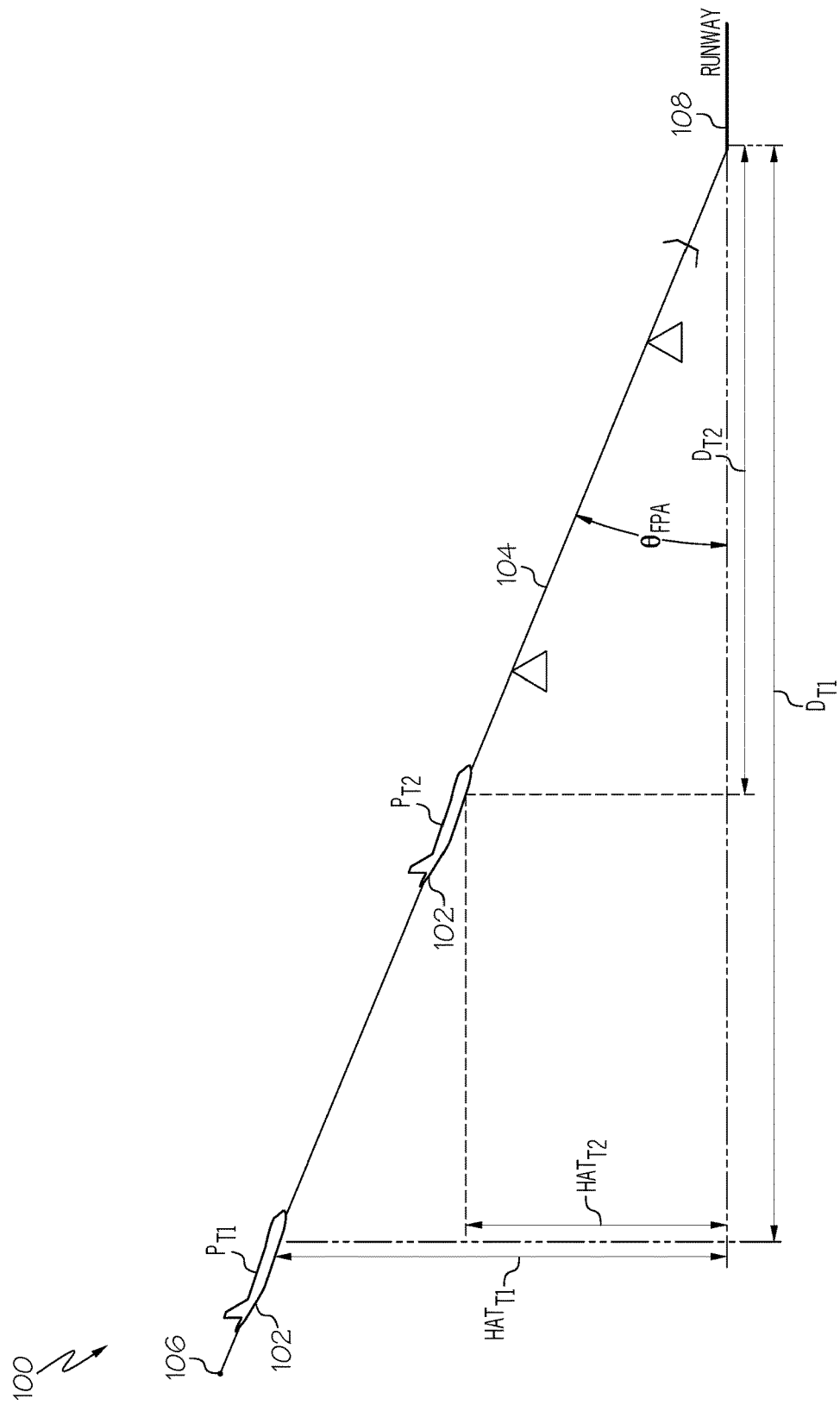

FIG. 3 is a flowchart setting-forth an exemplary process including an exemplary G/S validation algorithm, which can be carried-out by the cockpit display system of FIG. 1 to selectively eliminate mismatches between the vertical viewpoint of the SVS scene and G/S vertical deviation symbology appearing on the SV-PFD of FIG. 2 during an Instrument Landing System (ILS) approach; and FIG. 4 is a diagram of illustrating an exemplary ILS approach flown by an aircraft equipped with the cockpit display system of FIG. 1 and useful in describing calculations potentially performed when carrying-out the G/S validation algorithm included in the process of FIG. 3.

DETAILED DESCRIPTION

The following Detailed Description is merely exemplary in nature and is not intended to limit the invention or the application and uses of the invention. The term "exemplary," as appearing throughout this document, is synonymous with the term "example" and is utilized repeatedly below to emphasize that the description appearing in the following section merely provides multiple non-limiting examples of the invention and should not be construed to restrict the scope of the invention, as set-out in the Claims, in any respect. Furthermore, terms such as "comprise," "include," "have," and variations thereof are utilized herein to denote non-exclusive inclusions. Such terms may thus be utilized in describing processes, articles, apparatuses, and the like that include one or more named steps or elements, but may further include additional unnamed steps or elements.

As indicated above, there thus exists an ongoing need for cockpit display systems and methods for selectively eliminating mismatches that may occur during an Instrument Landing System (ILS) approach between Glide Slope (G/S) guidance symbology generated on a Synthetic Vision Primary Flight Display (SV-PFD) and the viewpoint of a Synthetic Vision System (SVS) scene (particularly, the vertical component of the SVS viewpoint) further generated on the SV-PFD. In satisfaction of this need, the following provides embodiments of a cockpit display system and method providing such functionalities. Specifically, embodiments of the cockpit display system may selectively carry-out a process during which an SV-PFD is repeatedly refreshed or updated to adjust the SVS scene viewpoint based at least partially on detected G/S signals, providing that the G/S signals are first validated and/or other conditions are satisfied. To determine whether the G/S signals are valid, the cockpit display system may selectively execute a G/S validation algorithm. During the G/S validation algorithm, flight data may be collected as the aircraft (A/C) flies the ILS approach and then utilized to establish a representative Flight Path Angle (FPA) value. If the disparity between the representative FPA value and an expected (e.g., published) G/S beam angle is sufficiently limited, the G/S signals may be deemed valid or trustworthy. The validated G/S signals may then be utilized to determine a vertical component of the SVS viewpoint based, in part, on the current Height Above Threshold (HAT) of the A/C relative to a destination runway. The SVS scene of the SV-PFD may then be updated accordingly to eliminate any disparity or mismatch between the SVS viewpoint and the vertical G/S deviation symbology concurrently generated on the SV-PFD.

In certain implementations, the cockpit display system may also generate an alert should there exist a significant discrepancy between the current HAT of the A/C, as calculated utilizing the validated G/S signals, and altitude data further provided to a controller of the cockpit display system by a default altitude data source, such as a barometric altimeter or a Global Positioning System (GPS) receiver. This alert is usefully presented as a textual annunciation or other visual alert produced on the SV-PFD. Similarly, if determining that the G/S signals are invalid or non-trustworthy when performing the G/S validation algorithm, the cockpit display system may generate a corresponding visual alert on the SV-PFD. In further embodiments, the cockpit display system may perform one or both of these alerting functionalities without carrying-out the above-described G/S-based SVS vertical viewpoint correction functionality. For this reason, embodiments of the cockpit display system may be broadly described herein as performing processes involving G/S validation during ILS approaches, with the G/S signals (if validated) potentially, but not necessarily utilized to correct a vertical component of an SVS scene generated on an SV-PFD. Additionally, while the SV-PFD is advantageously generated to include G/S vertical deviation symbology, this is not necessary in all embodiments. An exemplary embodiment of a cockpit display system suitable for performing such G/S validation processes will now be described in conjunction with FIG. 1.

FIG. 1 is a block diagram of a cockpit display system 10 deployed onboard an A/C, as illustrated in accordance with an exemplary and non-limiting embodiment of the present disclosure. As schematically illustrated in FIG. 1, cockpit display system 10 includes the following components or subsystems, each of which may be comprised of one device or multiple interconnected devices: (i) a controller 12, (ii) at least one cockpit display device 14, (iii) data sources 16, (iv) a pilot input interface 18, and (v) a memory 20 containing any number of onboard databases. Controller 12 includes at least first, second, and third inputs, which are operatively coupled to data sources 16, to pilot input interface 18, and to memory 20, respectively. Additionally, controller 12 includes at least first and second outputs, which are operatively coupled to cockpit display device 14 and to memory 20, respectively. In further embodiments, cockpit display system 10 may include a greater or lesser number of components, which may be interconnected in various different manners utilizing any combination of wireless or wired (e.g., avionic bus) connections. Although cockpit display system 10 is schematically illustrated in FIG. 1 as a single unit, the individual elements and components of cockpit display system 10 can be implemented in a distributed manner using any number of physically-distinct and operatively-interconnected pieces of hardware or equipment.

Cockpit display device 14 may be any image-generating device, which includes at least one display screen on which one or more graphical displays can be produced. Cockpit display device 14 will often be affixed to the static structure of the A/C cockpit, in which case display device 14 may assume the form of a head down display (HDD) or head-up display (HUD) unit. Alternatively, cockpit display device 14 may be a movable display device (e.g., a pilot-worn display device) or a portable display device, such as an Electronic Flight Bag (EFB) or laptop computer, which is carried into the A/C cockpit by a pilot or other aircrew member. During operation of cockpit display system 10, controller 12 drives cockpit display device 14 to generate one or more graphical displays thereon. For example, as further schematically indicated in FIG. 1, controller 12 may drive cockpit display device 14 to generate an SV-PFD 22 including an SVS scene 24, which may visually depict rendered terrain and other graphical features simulating the view from the A/C cockpit under ideal visibility conditions. SV-PFD 22 can also be generated to include G/S vertical deviation symbology 26, which may be overlaid onto or otherwise combined with SVS scene 24. In certain embodiments, SV-PFD 22 may further include various other G/S guidance symbols or graphical elements, such as symbology indicative of the lateral deviation of the A/C from a localizer beam.

Controller 12 may comprise or be associated with any suitable number of individual microprocessors, flight control computers, navigational equipment, memories (including or in addition to memory 20), power supplies, storage devices, interface cards, and other standard components known in the art. Controller 12 may include or cooperate with any number of software programs (e.g., avionics display programs) or instructions (e.g., as stored in memory 20) designed to carry out the various methods, process tasks, calculations, and control/display functions described throughout this document. Although illustrated as a separate block in FIG. 1, memory 20 may be integrated into controller 12 in certain embodiments. In one embodiment, controller 12 and memory 20 are produced as an Application Specific Integrated Circuit (ASIC), a System-in-Package (SiP), or a microelectronic module. Memory 20 may store data utilized to support the operation of cockpit display system 10 including one or more onboard databases 28, such as a runway, navigational, weather, and/or terrain databases. Among other information, onboard databases 28 may store published a plurality of expected G/S beam angles, which correspond to a plurality of ILS-enabled runways within range of the A/C. One or more of onboard databases 28 may be included in an Enhanced Ground Proximity Warning System (EGPWS) or a Runway Awareness and Advisory System (RAAS).

Data sources 16 can include any number of onboard sensors, datalinks, and other such components suitable for directly monitoring or wirelessly receiving data useful in performing the processes described herein. The particular types of data collected by data sources 16 and provided to controller 12 will vary amongst different embodiments of cockpit display system 10. Generally, data sources 16 will include an ILS receiver 30, such as a navigation radio, which is able to receive modulated G/S signals. Additionally, as indicated in FIG. 1, data sources 16 may also include an FPA data source 32, which provides direct FPA measurements or otherwise provides flight parameter measurements that can be utilized to calculate the A/C FPA as needed. In an embodiment, FPA data source 32 is an Inertial Reference System (IRS), such as ring laser gyroscope-based IRS unit, which provides controller 12 with highly accurate FPA measurements. Such precision IRS units are commercially available; e.g., the instant assignee, Honeywell International Inc. has developed and commercially markets laser-based IRS units under the trademark LASEREF®, which are capable of providing FPA measurement accuracies approaching or exceeding ±0.15 degree (°), two sigma. Data sources 16 further include a GPS device or receiver 33, which provides A/C positional data (altitude, latitude, and longitude). Finally, and although not individually shown in FIG. 1 to avoid unnecessarily cluttering the drawing, data sources 16 may include numerous other flight parameter sensors, which supply various other types of data to controller 12. Other data provided by data sources 16 may include, without limitation: airspeed data, groundspeed data, altitude data, attitude data including pitch data and roll measurements, yaw data, data related to gross A/C weight, time/date information, heading information, data related to atmospheric conditions, flight path data, flight track data, radar altitude data, geometric altitude data, wind speed and direction data, and fuel consumption data, to list but a few examples.

Turning now to FIG. 2, there is shown a screenshot of an exemplary SV-PFD 22, which is generated on cockpit display device 14 by controller 12 (FIG. 1). SV-PFD 22 is generated to include an SVS scene 24, which is displayed from a vantage point offset from the destination runway by a particular HAT and ground distance, as jointly determining the vertical SVS viewpoint. As can be seen in FIG. 2, SVS scene 24 contains graphical renderings of synthetic terrain and other geographical features, which simulate the view from the A/C cockpit under ideal visibility conditions. Additionally, SV-PFD 22 is generated to include G/S vertical deviation symbology 26, which is superimposed over or otherwise visually combined with SVS scene 24. Here, it is noted that reference numerals 22, 24, 26 are carried-over from cockpit display system 10 schematically shown in FIG. 1 for consistency and with the understanding that the appearance of SV-PFD 22, SVS scene 24, and G/S vertical deviation symbology 26 will vary amongst embodiments. G/S vertical deviation symbology 26 and SVS scene 24 (particularly, the vertical viewpoint from which SVS scene 24 is presented on SV-PFD 22) are described more fully below. First, however, a brief description of other graphic elements included within SV-PFD 22 is provided to help establish an exemplary context in which G/S vertical deviation symbology 26, the SVS viewpoint, and the below-described SVS viewpoint correction process may be better understood.

Many of the symbols or graphic elements shown in FIG. 2 are well-known within the avionics industry and will not be described in detail herein. For completeness, however, it is generally noted that SV-PFD 22 contains the following graphic elements in addition to SVS scene 24 and G/S vertical deviation symbology 26: (i) an airspeed indicator or "airspeed tape" 34 featuring a precision readout window 36 (located in the upper left corner of SV-PFD 22); (ii) an altitude indicator or "altitude tape" 38 featuring a precision readout window 40 (located in the upper right corner of SV-PFD 22); (iii) a vertical speed indicator 42 featuring a precision readout window 44 (located adjacent altitude tape 38); (iv) a barometric pressure setting readout 46 (located beneath altitude tape 38); (v) Horizontal Situation Indicator (HSI) symbology 48 including a rotating compass graphic 50 and an A/C icon 52 (located in the lower central region of SV-PFD 22); (vi) Attitude Director Indicator (ADI) graphics 54 including roll arc graphic 56, an ADI A/C symbol 58 in the form of two L-shaped polygons, a zero pitch reference line 60, and a pitch tape graphic 62; and (vii) a flight path vector icon 64, which moves across SV-PFD 22 to reflect changes in the flight path of the A/C during operation of cockpit display system 10.

In the flight scenario illustrated in FIG. 2, the A/C is carrying-out an ILS approach terminating at a destination runway. SVS scene 24 is thus generated to include a runway graphic 66 representative of the destination runway. G/S vertical deviation symbology 26 is also presented on SV-PFD 22 to assist in piloting the A/C to closely track the G/S beam as the A/C progresses along the ILS approach. G/S vertical deviation symbology 26 includes a vertical deviation scale 68, which is produced alongside a vertical deviation indicator or marker 70. During the ILS approach, controller 12 (FIG. 1) updates or refreshes SV-PFD 22 to create the appearances that vertical deviation marker 70 slides vertically alongside scale 68 in a manner denoting vertical A/C deviations from the G/S beam. In the illustrated example, vertical deviation scale 68 is given the appearance of a column of vertically-spaced markers, such as circular markers positioned above and below a central hash marker. Vertical deviation scale 68 may be generated in a pre-established informational color, such as white. Comparatively, vertical deviation marker 70 may be generated as a triangular symbol having another color, such as magenta. The foregoing notwithstanding, the appearance of G/S vertical deviation symbology 26 will vary in further embodiments, as will the appearance of the various other visual elements forming SV-PFD 22.

The viewpoint of SVS scene 24 may be determined based solely upon altitude data, which may be provided by a barometric altimeter included within onboard data sources 16 and/or by GPS receiver 33 (FIG. 1). The vertical component of the SVS viewpoint, in particular, may be dictated by such altimeter data and/or altitude data received from GPS receiver 33. As previously indicated, GPS altitude data generally tends to be more accurate than barometric altimeter data and, thus, may be preferentially utilized in determining the vertical component of the viewpoint from which SVS scene 24 is present on SV-PVD 22. However, the GPS data is not immune to error and may also be subject to non-trivial inaccuracies in the vertical direction in certain circumstances. For example, relatively pronounced vertical inaccuracies in GPS altitude data may occur in non-Space-Based Augmentation System (non-SBAS) environments in which GPS vertical position accuracy can be significantly reduced as compared to Wide Area Augmentation System (WAAS) and European Geosynchronous Navigation Overlay System (EGNOS) environments; e.g., in non-SBAS environments, errors in the GPS position data can approach and possibly exceed 30 to 40 feet (9.1 to 12.2 meters) in the vertical direction.

In accordance with embodiments of the present disclosure, cockpit display system 10 may selectively switch between updating or adjusting the vertical component of the SVS viewpoint utilizing either the altitude data (e.g., barometric altimeter readings or GPS altitude data received from GPS receiver 33) or, instead, as a function of the G/S signals received via ILS receiver 30 (possibly, but not necessarily combined with other concurrently-received altitude data, such as GPS altitude data). To ensure a high level of data integrity, however, cockpit display system 10 may first require that certain criteria are satisfied before usage of the G/S signals in updating the vertical component of the SVS viewpoint, as will now be described in conjunction with FIGS. 3 and 4 below. The following description focuses primarily on implementations wherein the altitude data is primarily received as GPS altitude data; however, further embodiments are applicable to approaches wherein the altitude data is derived from a different source or combination of sources, such as barometric altimeter readings.

FIG. 3 is a flowchart setting-forth an exemplary process 80, which can be performed by controller 12 of cockpit display system 10 (FIG. 1) to selectively update the viewpoint of SVS scene 24 of SV-PFD 22 (FIG. 2) utilizing G/S signals received by ILS receiver 30 (FIG. 1). In so doing, process 80 eliminates mismatches between the SVS viewpoint and G/S vertical deviation symbology 26, as might otherwise occur in conventional display systems. For this reason, process 80 is referred to more fully below as "SVS viewpoint correction process 80." SVS viewpoint correction process 80 may also provide other functionalities; e.g., as further described below, process 80 may also generate alerts based upon invalidity of the G/S signals or the detection of relatively large disparities between the A/C HAT (as calculated utilizing validated G/S signals) and concurrently-received altitude data provided by GPS receiver 33 or another source (e.g., a barometric altimeter included within onboard data sources 16). SVS viewpoint correction process 80 includes a number of processes or steps, which are identified in FIG. 3 and referred to below as STEPS 82, 84, 86, 88, 90, 92, 94. These steps are each discussed, in turn, below. SVS viewpoint correction process 80 is presented by way of non-limiting example only and with the additional steps may be performed, certain steps may be omitted, or the sequence of steps may vary in alternative embodiments of process 80.

As SVS viewpoint correction process 80 commences, it is first determined whether one or more criteria are satisfied for continued performance of process 80 (STEP 82, FIG. 3). In an embodiment, continued execution of SVS viewpoint correction process 80 beyond STEP 82 requires satisfaction of certain conditions under which modulated G/S signals can be reliably measured during a typical or representative ILS approach. For example, STEP 82 may require that the current altitude of the A/C falls within a specified altitude range, whether expressed in terms of HAT, Above Ground Level (AGL) altitude, or a similar altitude-based measurement. As more specific example, controller 12 may determine during STEP 82 whether the current A/C vertical position resides between an upper (maximum) altitude threshold and a lower (minimum) altitude threshold. The upper altitude threshold may be selected as an altitude above which A/C instability, G/S signal weakness, and other such factors may render the FPA measurements collected during STEP 84 (described below) excessively unreliable. In one embodiment, and by way of non-limiting example only, the upper altitude threshold may be between about 1000 and about 1200 feet (304.8 to 365.7 meters) HAT. Comparatively, the lower altitude threshold may be selected as an altitude below which the likelihood of G/S signal interference (e.g., due to ground-induced G/S signal oscillation) becomes undesirably high. In one embodiment, the minimum altitude threshold ranges from about 180 feet to about 220 feet (55 to 67 meters) HAT. In other embodiments, the minimum altitude threshold may be greater than or less than the aforementioned range. The current altitude of the A/C may be estimated by controller 12 during STEP 82 utilizing any combination of GPS altitude data, altimeter data, and/or readings from other altitude data sources.

If controller 12 determines that the criteria for continued performance of process 80 are not satisfied during STEP 82, SVS viewpoint correction process 80 loops until such time as the criteria for continued performance of process 80 become satisfied or the current ILS approach is completed. Conversely, if determining that the criteria for continued performance of process 80 are satisfied, controller 12 progresses to STEP 84 of SVS viewpoint correction process 80. During STEP 84, controller 12 executes a G/S validation algorithm; that is, a program or sub-process utilized to evaluate the trustworthiness of the presently-received G/S signals and G/S beam defined thereby. During STEP 84, controller 12 advantageously validates or verifies the trustworthiness of the G/S signals based at least partly upon the disparity, if any, between a representative FPA value and an expected G/S beam angle, as described more fully below.

Controller 12 of cockpit display system 10 (FIG. 1) may validate the G/S signals during STEP 84 as a function of any disparity between a representative FPA value and an expected G/S beam angle. In this case, controller 12 may establish the representative FPA value by aggregating or collecting flight data during performance of the ILS approach by the A/C. For example, controller 12 may determine the representative FPA value from multiple FPA measurements provided by FPA data source 32 (e.g., an IRS) during the ILS approach. In an embodiment, controller 12 continually averages the FPA measurements (or otherwise calculates a representative value from the FPA measurements) as provided by FPA data source 32 and aggregated over the elapsed time period of the ILS approach, while further excluding those FPA measurements failing to satisfy one or more predetermined data constraints. The predetermined data constrains may be selected to eliminate those FPA measurements taken when A/C flight parameters deviate excessively from the G/S beam; e.g., due to vertical displacement from the G/S beam (informally, vertical bouncing of the A/C) and a corresponding change in the pitch of the A/C as the pilot attempts to recapture the G/S beam. In an embodiment, the predetermined data constraints include one or more of the following: (i) a maximum acceptable G/S signal deviation, (ii) a maximum acceptable FPA value deviation from a reference value, and (iii) a maximum acceptable vertical speed deviation from expected approach values. Non-limiting examples of the maximum acceptable G/S signal deviation, FPS value deviation, and vertical speed deviation are about ±0.25 dot, about ±0.175 degrees, and about 60 feet (18.3 meters) per minute, respectively. In other embodiments, the FPA reference value may be determined in another manner.

After establishing the reference FPA value, controller 12 next compares the reference FPA value to an expected G/S beam angle pursuant to the G/S validation algorithm performed during STEP 84 of process 80 (FIG. 3). The expected G/S beam angle may be determined by recalling a published G/S beam angle corresponding to the destination runway, as stored in a runway or navigational database contained within onboard databases 28. Alternatively, a runway-specific G/S beam angle may be identified by pilot-entered data received via pilot input interface 18, may be provided by querying an FMS included within or associated with cockpit display system 10, may be wireless transmitted to display system 10 by Air Traffic Control (ATC) or another air traffic authority, or may otherwise be provided to cockpit display system 10. If a runway-specific G/S beam angle cannot be established, a default value may be utilized. The default G/S beam angle may be pre-established value (e.g., 3°) or value range. Controller 12 then compares the reference FPA value to the expected G/S beam angle to determine the disparity therebetween. Controller 12 may consider the G/S signals valid if the representative FPA value is within a maximum acceptable disparity threshold (e.g., about one dot) relative to the expected G/S beam angle, while standard deviation is less than a deviation threshold (e.g., about one dot), with sufficient data samples collected.

G/S validation algorithm need not consider multiple FPA measurements in validating the G/S signals in all embodiments. It is, for example, possible to calculate a measured FPA value utilizing instantaneous altitude data, such as instantaneous barometric altimeter readings or instantaneous GPS altitude data. Here, brief reference is made to FIG. 4, which sets-forth a diagram 100 illustrating an exemplary ILS approach flown by an A/C 102 equipped with cockpit display system 10 (FIG. 1). As can be seen, A/C 102 is traveling along a flight path generally overlapping with G/S beam 104 and extending from a point 106 to a threshold or touchdown zone of a destination runway 108. A/C 102 is shown in two time-dependent positions: (i) a first position ($P_{T1}$), which represents the position of A/C 102 at a first time ($T_1$); and (ii) a second position ($P_{T2}$), which represents the A/C position at a second time ($T_2$) occurring after time T1. At a given juncture in time, the current HAT of A/C 102 can be determined in accordance with the following equation:

$$D \times \tan(\theta_{FPA}) = HAT \qquad \text{EQ. 1}$$

wherein HAT is the height above the threshold of A/C 102 with respect to runway 108 at a given moment in time, and D is the horizontal (ground) distance to from A/C 102 to the threshold or touchdown zone of runway 108. Furthermore, $\theta_{FPA}$ is the current FPA value, which is equivalent to the G/S beam angle in an idealized scenario in which the A/C is precisely aligned with and does not deviate from G/S beam 104 during the ILS approach.

Here, it is noted that the current FPA value ($\theta_{FPA}$) can be calculated from EQ. 1, as D and HAT are known (or at least estimated) quantities. Specifically, the current HAT of the A/C can be determined (or approximated) from the GPS altitude data (or barometric altimeter readings) as compared to the known altitude of runway 108, while D can be determined (or approximated) from the GPS horizontal data (latitude and longitude) of the A/C relative to the known horizontal position of runway 108, as recalled from databases 28. This is emphasized by the rewritten version of EQ. 1 below, which is referred to hereafter as EQ. 2:

$$\tan(\theta_{FPA}) = \frac{HAT}{D} \qquad \text{EQ. 2}$$

EQ. 2, then, may be utilized to determine the FPA reference value in certain implementations of the G/S validation algorithm. This simplistic approach, however, is prone to errors in calculating the value of $\theta_{FPA}$ due, at least in part, to the above-described potential inaccuracies in the GPS altitude data (or other altitude data, such as barometric altimeter readings). Such errors in calculating $\theta_{FPA}$ utilizing EQ. 2 and instantaneous GPS altitude data may become increasingly pronounced as A/C 102 approaches runway 108. Consider, for example, a first scenario wherein the HAT of A/C is 400 feet (121.9 meters) when A/C 102 resides in position $P_{T1}$ ($H_{T1}$=400 feet HAT) and the GPS altitude data is errant by 40 feet, as might occur in a non-SBAS environment. As the GPS vertical error constitutes a significant fraction of $H_{T1}$, the GPS error will introduce considerable error into the calculated flight path angle value ($θ_{FPA}$). This error will become increasingly pronounced as A/C 102 closes toward runway 108 even as the GPS error remains unchanged. For example, if the HAT of A/C 102 is 200 feet (60.9 meters) when A/C 102 arrives at position $P_{T2}$ ($H_{T2}$=200 feet HAT) and the GPS altitude data is again errant by 40 feet, the inaccuracy in the calculated value of the flight path angle ($θ_{FPA}$) will be greatly amplified.

The above-described errors in calculating flight path angle ($θ_{FPA}$) can be reduced by utilizing time-averaged (rather than instantaneous) data. In embodiments wherein GPS data is utilized to calculate $θ_{FPA}$, the following equation may pertain:

$$\tan(θ_{FPA}) = \frac{\Delta HAT/\Delta T}{\Delta D/\Delta T} \qquad \text{EQ. 3}$$

wherein ΔH is the relative change in HAT over time period ΔT, and ΔD is the change in the horizontal (ground) distance from the A/C to the destination runway over time period ΔT.

The usage of GPS data (or barometric altimeter readings) in calculating a time-averaged $θ_{FPA}$ value, as indicated in EQ. 3, may thus be employed in certain embodiments of process 80. This notwithstanding, in embodiments in which cockpit display system 10 is equipped with FPA data source 32 (FIG. 1), further precision may be gained by utilizing the highly accurate FPA measurements supplied by FPA data source 32 during the ILS approach to calculate a time-averaged $θ_{FPA}$ value. Such FPA measurements are thus advantageously (although not necessarily) utilized to arrive at a time-averaged $θ_{FPA}$ value. Again, the FPA measurements are advantageously (although not necessarily) time-averaged or otherwise considered over an appropriate time frame to reduce errors potentially resulting from the usage of instantaneous data, as previously described.

In the foregoing description connected to FIG. 4, the flight path angle ($θ_{FPA}$) is assumed to be substantially equivalent to the G/S beam angle. This assumption is valid only under ideal flight conditions; that is, when A/C 102 experiences zero vertical deviation and essentially perfect stability as A/C 102 progresses along G/S beam 104. Under real world flight conditions, however, A/C 102 will often experience vertical deviations from G/S beam 104 and less than perfect stability as A/C 102 attempts to follow G/S beam 104 to runway 108. Importantly, SVS viewpoint correction process 80 compensates for such deviations through the application of the performance criteria discussed above in conjunction with STEP 82 and the data constraints discussed above in conjunction with STEP 84. It has been found, with the application of such conditions and data constraints, and providing that a sufficient data set (e.g., a sufficiently large number of FPA measurements) is collected during STEP 84, a highly accurate flight path angle value ($θ_{FPA}$) can be calculated, which is equivalent to or which closely approximates the angle of a G/S beam defined by the received G/S signals. Consequently, the calculated flight path angle value ($θ_{FPA}$) may be suitable for usage as the reference FPA value during the G/S validation algorithm performed at STEP 84.

With continued reference to exemplary SVS viewpoint correction process 80 shown in FIG. 3, factors or parameters other than FPA may also or alternatively be considered during the G/S validation algorithm performed at STEP 84. For example, in some implementations, controller 12 may consider the classification or categorization of the ILS approach in determining the validity or trustworthiness of the G/S signals. In this regard, a more stringent G/S validation process may be applied to Category (CAT) I ILS approaches than to CAT II-III approaches, the latter of which may be subject to less stringent G/S validation processes or may not be subject to additional validation beyond a determination of the ILS approach categorization. In certain instances, controller 12 of cockpit display system 10 may automatically deem the G/S signals valid in response to identification of the ILS approach as a CAT II or CAT III approach. The G/S validation algorithm may then conclude, and SVS viewpoint correction process 80 may advance to STEP 86. Alternatively, if identifying the current approach as a CAT I approach, controller 12 may perform the above-described data analysis process to complete the G/S validation algorithm prior to advancing to STEP 86 of process 80 (FIG. 1).

After completion of G/S validation algorithm (STEP 84), controller 12 determines the next appropriate actions based upon whether the G/S signals have been deemed valid or invalid. If the G/S signals have been deemed invalid or untrustworthy during STEP 84, controller 12 advance to STEP 88 and ceases performance of SVS viewpoint correction process 80 for the remainder of the current ILS approach. This, in effect, will result in operation of cockpit display system 10 in default mode during which adjustments to the vertical component of the SVS viewpoint continue to be implemented in accordance with altitude data, such as barometric altimeter readings or GPS altitude data supplied by GPS receiver 33. Additionally, as indicated at STEP 88 of process 80 (FIG. 3), a visual alert may be presented on SV-PFD 22 indicating that the G/S signals may be invalid or untrustworthy. This alert is logically presented as visual alert on SV-PFD 22, such as a textual annunciation appearing on SV-PFD 22. An example of such a text annunciation 96 is shown in FIG. 2. When produced, text annunciation 96 can be color coded to pre-established caution or warning color, such as amber or red. An animation (e.g., flashing) may be applied to text annunciation 96, if desired. In other embodiments, a different type of visual alert may be produced on SV-PFD 22 (e.g., as expressed through a change in the appearance of SVS vertical deviation symbology 26), a different type of alert (e.g., an audible alert) can be produced in addition to or in lieu of a visual alert, or no such alert may be generated.

If, instead, confirming that the G/S signals are deemed valid or trustworthy during STEP 84, controller 12 of cockpit display system 10 (FIG. 1) next advances to STEP 90 of SVS viewpoint correction process 80 (FIG. 3). During STEP 90, controller 12 determines whether the disparity between the current HAT of the A/C, as calculated utilizing the G/S signals, and the corresponding altitude data (e.g., altimeter altitude data or other GPS altitude data) exceeds an alert threshold. Controller 12 may determine the current HAT of the A/C based upon: (i) a current ground (horizontal) distance from the A/C to the destination runway, (ii) the representative FPA value and the G/S beam angle (now validated), and possibly (iii) an estimated vertical deviation of the A/C position from the G/S beam, as determined based upon the G/S signals received via ILS receiver 30. In one approach, an on-beam position of the A/C is first estimated as a function of the current ground distance from the A/C to the destination runway (e.g., as reported by GPS receiver 33) and the G/S beam angle (or representative FPA value). The actual A/C vertical position may then be determined by adjusting the on-beam A/C position to compensate for any present A/C vertical deviation from the G/S beam or path, as indicated by the presently-received G/S signals.

If determining that the disparity of the G/S-based HAT of A/C and the GPS altitude data (or barometric altimeter readings) does not exceed the alert threshold during STEP 90, controller 12 of cockpit display system 10 (FIG. 1) proceeds directly to STEP 94 of SVS viewpoint correction process 80 (FIG. 3) and updates the SVS scene in accordance with the current G/S based-HAT of the A/C, as described below. Conversely, if the disparity of the G/S-based HAT of A/C and the GPS altitude data (or barometric altimeter readings) exceeds the alert threshold, controller 12 instead progresses to STEP 92 and generates an alert. This alert may be similar to the alert generated at STEP 88 and may also assume the form of a visual alert generated on SV-PFD 22. For example, as indicated in FIG. 2 at 98, the alert may be generated as a textual annunciation appearing on SV-PFD 22, which may be color coded to pre-established caution or warning color, such as amber or red. After generation of this alert, controller 12 may then continue to STEP 94 of SVS viewpoint correction algorithm 80. In other embodiments, process 80 may not include STEPS 90, 92 and may instead proceed directly to STEP 94 after STEP 86.

Next, at STEP 94 of process 80 (FIG. 3), controller 12 utilizes the current HAT of the A/C, as calculated based upon the G/S signals, to update the vertical component of the SVS viewpoint of SVS scene 24 (FIG. 3) as appropriate during the ILS approach. Across multiple iterations of SVS viewpoint correction process 80, this may result in repeated (essentially continual or real time) adjustment of the vertical component of the SVS viewpoint utilizing the G/S signals until such time as the criteria for continued performance of process 80 (as evaluated at STEP 82) are no longer satisfied. During STEP 94, controller 12 may then utilize the current G/S-based HAT and the current ground distance from the A/C to determine the vertical component of the SVS viewpoint; in particular, the height of the viewpoint is determined by the current HAT, while the downwardly-titled angle of viewpoint is determined by the HAT and the current horizontal (ground) distance separating the A/C and the destination runway. Controller 12 then updates or refreshes SV-PFD 22 to visually adjust a vertical component of the SVS viewpoint in accordance with the G/S signals. Furthermore, during initial iterations of SVS viewpoint correction process 80, controller 12 may first determine whether there exists a significant discrepancy between the SVS viewpoint selected based upon the GPS vertical position and the SVS viewpoint calculated from the FPA validated G/S data. If a significant discrepancy exists, controller 12 may gradually phase in the SVS viewpoint correction over a predetermined time period on the order of, for example, a few seconds. Similarly, when returning to a modality in which the vertical component of the SVS viewpoint is set by the GPS altitude data rather than the G/S signals, a phase-in or gradual handoff stage may be applied.

This concludes the present iteration of SVS viewpoint correction process 80 (FIG. 3). Controller 12 of cockpit display system 10 (FIG. 1) now returns to STEP 82 of process 80 and again evaluates whether the criteria for performing further iterations of process 80 remain satisfied. If this is the case, controller 12 repeats the previously-described steps to continually or repeatedly update the SVS viewpoint of SVS scene 24 (FIG. 2) on a real time or near real time basis. If the criteria for performing further iterations of process 80 are no longer satisfied (e.g., due to the current A/C position descending below the lower altitude threshold), SVS viewpoint correction process 80 loops (STEP 82) until such time as the criteria are against satisfied. While process 80 loops via STEP 82, the SVS viewpoint may be determined utilizing altitude data provided by a default altitude data source (e.g., GPS altitude data provided by GPS receiver 33 or barometric altimeter readings), as previously described. In effect, controller 12 switches between an operative mode in which the vertical component of the SVS scene viewpoint is updated or refreshed utilizing GPS altitude data (or barometric altimeter readings) and an operative mode in which the SVS scene viewpoint is adjusted utilizing G/S-based HAT calculations.

There has thus been provided embodiments of a cockpit display system and method, which eliminates disparities between SVS viewpoint and the G/S vertical deviation symbology generated on a SV-PFD during an ILS approach. As described above, the cockpit display system selectively updates the SVS viewpoint utilizing flight (e.g., FPA) data collected by the A/C when piloted to follow the G/S path during an ILS approach. The G/S beam or path may be selectively validated (e.g., when the ILS approach is a CAT I approach) and/or the FPA data may be filtered to ensure integrity prior to usage. The SVS viewpoint may be adjusted based upon the FPA-derived G/S and the current ground distance between the A/C and the runway touchdown point. Any mismatches between the SVS viewpoint and the G/S vertical deviation marker arising from vertical inaccuracies in the altitude data (e.g., GPS altitude data and/or barometric altimeter readings) will consequently be eliminated. If insufficient FPA data is collected, or if the G/S signals are deemed unreliable, the SVS scene may be updated utilizing the altitude data rather than the G/S signals. In certain implementations, the cockpit display system may also generate a visual alert on the SV-PFD should there exist a significant discrepancy between the G/S-based HAT and the corresponding altitude data (e.g., GPS altitude data and/or barometric altimeter readings). Additionally or alternatively, the cockpit display system may generate a visual alert on the SV-PFD if determining that the G/S signals are invalid or non-trustworthy pursuant to performance of the G/S validation algorithm. In still further embodiments, the cockpit display system may perform such alerting functions or other functions in conjunction with performance of the G/S validation algorithm without necessarily carrying-out the above-described G/S-based SVS vertical viewpoint correction functionality.

While at least one exemplary embodiment has been presented in the foregoing Detailed Description, it should be appreciated that a vast number of variations exist. It should also be appreciated that the exemplary embodiment or exemplary embodiments are only examples, and are not intended to limit the scope, applicability, or configuration of the invention in any way. Rather, the foregoing Detailed Description will provide those skilled in the art with a convenient road map for implementing an exemplary embodiment of the invention. Various changes may be made in the function and arrangement of elements described in an exemplary embodiment without departing from the scope of the invention as set-forth in the appended Claims.

What is claimed is:

1. A cockpit display system onboard an aircraft, the cockpit display system comprising:

an Instrument Landing System (ILS) receiver configured to detect Glide Slope (G/S) signals during an ILS approach flown by the aircraft and terminating at a destination runway;
a cockpit display device on which a Synthetic Vision Primary Flight Display (SV-PFD) is generated, the SV-PFD including a Synthetic Vision System (SVS) scene presented from an SVS viewpoint; and
a controller operably coupled to the cockpit display device and to the ILS receiver, the controller configured to:
selectively perform a G/S validation algorithm to determine the validity of the G/S signals received during the ILS approach; and
if determining that the G/S signals are valid, repeatedly update a vertical component of the SVS viewpoint during the ILS approach based upon the G/S signals.

2. The cockpit display system of claim 1 wherein the controller is configured to repeatedly update the vertical component of the SVS viewpoint by repeatedly calculating a current Height Above Threshold (HAT) of the aircraft relative to the destination runway as a function of: (i) a current ground distance from the aircraft to the destination runway, and (ii) an angle of a G/S beam defined by the G/S signals.

3. The cockpit display system of claim 2 wherein the controller is further configured to:
estimate a vertical deviation of the aircraft from the G/S beam during the ILS approach; and
consider the estimated vertical deviation in calculating the current HAT of the aircraft relative to the destination runway.

4. The cockpit display system of claim 3 wherein the controller is further configured to generate G/S vertical deviation symbology on the SV-PFD indicative of the estimated vertical deviation of the aircraft from the G/S beam during the ILS approach.

5. The cockpit display system of claim 1 further comprising an altitude data source configured to provide altitude data to the controller;
wherein the controller is coupled to the altitude data source and further configured to switch between updating the vertical component of the SVS viewpoint utilizing the G/S signals and utilizing the altitude data during the ILS approach based, at least in part, on an altitude of the aircraft.

6. The cockpit display system of claim 5 wherein the controller is configured to:
utilize the G/S signals to update the vertical component of the SVS viewpoint when the current Height Above Threshold (HAT) of the aircraft relative to the destination runway is within a predetermined HAT range; and
utilize the altitude data to update the vertical component of the SVS viewpoint when the HAT of the aircraft is outside of the predetermined HAT range.

7. The cockpit display system of claim 1 wherein the controller is further configured to generate a visual alert on the SV-FPD if determining that the G/S signals are invalid.

8. The cockpit display system of claim 1 wherein the controller, when performing the G/S validation algorithm, is configured to:
establish a representative Flight Path Angle (FPA) value based, at least in part, on flight data aggregated during performance of the ILS approach by the aircraft; and
determine whether the G/S signals are valid based, at least in part, on a comparison between the representative FPA value and an expected G/S beam angle corresponding to the destination runway.

9. The cockpit display system of claim 8 further comprising an onboard database storing a plurality of expected G/S beam angles corresponding to a plurality of runways;
wherein the controller is coupled to the onboard database and configured to recall the expected G/S beam angle corresponding to the destination runway from the onboard database.

10. The cockpit display system of claim 8 further comprising an FPA data source configured to provide FPA measurements;
wherein the controller is coupled to the IRS and configured to establish a representative FPA value by averaging multiple FPA measurements provided by the FPA data source during the ILS approach.

11. The cockpit display system of claim 10 wherein the controller is further configured to eliminate from consideration in averaging the multiple FPA measurements those FPA measurements failing to satisfy one or more predetermined data constraints.

12. The cockpit display system of claim 11 wherein the one or more predetermined data constraints comprise a maximum acceptable angular deviation from an expected FPA value.

13. The cockpit display system of claim 11 wherein the one or more predetermined data constraints comprise a maximum acceptable vertical deviation from an expected vertical position of the aircraft.

14. The cockpit display system of claim 11 wherein the one or more predetermined data constraints comprise a maximum acceptable speed deviation from an expected vertical speed of the aircraft.

15. The cockpit display system of claim 1 wherein the controller is configured to selectively perform the G/S validation algorithm based, at least in part, on a categorization of the ILS approach.

16. The cockpit display system of claim 1 further comprising a Global Positioning System (GPS) receiver configured to provide GPS altitude data and coupled to the controller;
wherein the controller, if determining that the G/S signals are valid, is further configured to:
calculate a current Height Above Threshold (HAT) of the aircraft based, at least in part, on an angle of a G/S beam defined by the G/S signals; and
generate a visual alert on the SV-FPD if a disparity between the current HAT and the GPS altitude data exceeds a threshold value.

17. A cockpit display system onboard an aircraft, the cockpit display system comprising:
an Instrument Landing System (ILS) receiver configured to receive Glide Slope (G/S) signals as the aircraft flies an ILS approach terminating at a destination runway;
a cockpit display device on which a Synthetic Vision Primary Flight Display (SV-PFD) is generated; and
a controller operably coupled to the cockpit display device and to the ILS receiver, the controller configured to:
selectively perform a G/S validation algorithm to determine the validity of the G/S signals received during the ILS approach; and
generate a visual alert on the SV-PFD if determining that the G/S signals are invalid.

18. The cockpit display system of claim 17 further comprising an Inertial Reference System (IRS) coupled to the controller;

wherein the controller is further configured to:
- establish a representative Flight Path Angle (FPA) value as a function of FPA measurements provided by the IRS during the ILS approach; and
- determine the validity of the G/S signals based upon any disparity between the representative FPA value and an expected G/S beam angle corresponding to the destination runway.

19. A method carried-out by a cockpit display system including a cockpit display device, an Instrument Landing System (ILS) receiver, and a controller operably coupled to the cockpit display device and to the ILS receiver, the method comprising:
- generating a Synthetic Vision Primary Flight Display (SV-PFD) on the cockpit display including a Synthetic Vision System (SVS) scene presented from an SVS viewpoint;
- at the controller, selectively performing a Glide Slope (G/S) validation algorithm to determine whether G/S signals detected by the ILS receiver during an ILS approach are valid; and
- if determining the G/S signals to be valid, repeatedly refreshing the SV-PFD during the ILS approach to visually adjust a vertical component of the SVS viewpoint in accordance with the G/S signals.

20. The method of claim 19 further comprising generating a visual alert on the SV-PFD if the determining the G/S signals to be invalid.

* * * * *